106. COMPOSITIONS,
84 COATING OR PLASTIC

Patented Nov. 8, 1938

2,135,915

UNITED STATES PATENT OFFICE 2,135,915

BASIS MASS FOR DENTAL REPAIR PARTS

Friedrich Schönbeck, Berlin-Biesenthal, and Hermann Schröder, Berlin, Germany, assignors to Winthrop Chemical Company, Inc., New York, N. Y., a corporation of New York No Drawing. Application June 5, 1935, Serial No. 25,194. In Germany June 5, 1934

4 Claims. (Cl. 106—51)

This invention relates to a basis mass for dental repair parts.

Artificial teeth and other dental repair parts have been produced by means of gold, platinum and other known metals or by means of alloys thereof, or by ceramic melts, such as difficultly melting glass fluxes. Combinations of ceramic masses with carriers or supporting bodies could not be produced in a satisfactory manner because the adhesive power of the ceramic mass on supporting bodies from metal or other substances did not satisfy the practical requirements. A direct burning of a dental ceramic mass on a metallic supporting body is for instance impossible in view of the slight mechanic resistivity of the ceramic parts produced in this manner.

The present invention provides for a basis mass which is free from the said disadvantages, and which may be used with or without supporting parts.

In accordance with the present invention the new basis mass for dental repair parts is obtained by combining a substantial quantity of a calcined magnesium silicate with ceramic masses which are usual for dental purposes, such as frits or glass fluxes. The new basis mass containing as a substantial component calcined magnesium silicate may be variously composed. A basis mass which is particularly suitable for firmly connecting a supporting body, for instance, a metallic body with ceramic dental repair parts is for instance obtained by evenly distributing 50 parts by weight of a calcined or water-free magnesium silicate, for instance, soap-stone of the kind of steatite or talc in a ground mass which consists of 15 parts by weight of ground quartz and 10 parts by weight of feldspar, 5 parts by weight of calc-spar and 8 parts by weight of calcined borax, 15 parts by weight of finely ground sand may be added. The mixing of the components is carried out either after the components of the ground mass are sintered at a higher temperature, say at about 1200–1300° C., the sintered mass is chilled by pouring into water and then again finely ground, or the calcined magnesium silicate is mixed with the non-sintered ground mass, the mixture is then sintered, chilled and ground. The calcination of the magnesium silicate may be carried out together with this sintering process. The basis mass thus obtained may be used as such or it may be mixed with other additional substances. For instance, an addition of 10 parts by weight of feldspar, 5 parts by weight of porcelain clay, 5 parts by weight of kaolin and 10 parts by weight of quartz has proved to be suitable. A further addition of calcined magnesium silicate, for instance, of about 10 parts by weight, may be of advantage for certain purposes. Of course, all the components are used for the mixture in a finely divided state.

The manufacture of the dental repair parts with the aid of the afore-mentioned basis mass proceeds when using a supporting body in the following manner:

The basis mass is made into a plastic paste with the addition of water or gum arabic solution. The paste is put on to the supporting body in the desired form and quantity. The further working up depends on the character of the dental ceramic masses which are to be combined with the basic body prepared as described above. If the dental ceramic mass which is to be combined with the basic body consists of parts of burnt porcelain, for instance, of artificial teeth prepared from burnt porcelain, these porcelain parts are imbedded in the basic body in the desired manner, and the whole model is then heated to the sintering temperature, that is to about 1100–1300° C. Burnt porcelain may also be modelled in the customary manner on the basic body. The model thus obtained is then burnt in the customary manner. Then the model obtains its glaze in the usual manner. If, however, the basic body is to be combined with a part prepared from dental cast porcelain, the basic body prepared as described above is directly heated to the sintering temperature and the cast porcelain parts are then brought on the model thus obtained in the manner which is known for the working with cast porcelain.

In the product thus prepared the basic mass simultaneously effects a firm connection between the ceramic dental repair parts and the metallic supporting body, on the one hand, and an increase of the mechanical strength of the supporting body on the other hand. For instance, the mechanic resistivity of a platinum tube is greatly increased by covering it with a basis mass as specified above.

Another basis mass which preferably is used without a supporting body may be prepared, for instance, from 20 grams of calcined magnesium silicate, preferably calcined steatite, 4.5 parts by weight of cristobalite, 6 parts by weight of feldspar, 1.5 parts by weight of calc-spar, 2.2 parts by weight of boric acid and 6 parts by weight of a usual pink color. This mixture is sintered at 1200° C., chilled by pouring into water, finely ground and mixed with 1.5 parts by weight of porcelain clay, 1.5 parts by weight of kaolin, 6 parts by weight of a usual pink color, and 10.5 parts by weight of cristobalite. Coloring substances which are usual in such dental ceramic masses may be added as desired. The basis mass thus obtained may be combined with the dental ceramic masses, that is with burnt or cast porcelain, in the manner set forth above.

The basis mass may also be composed as follows: 10 parts by weight of calcined steatite, 10 parts by weight of corundum, 2 parts by weight of hard glass, for instance, the known Jena glass, 2 parts by weight of porcelain clay, 2 parts by weight of potassium feldspar, 5 parts by weight of cristobalite and 2 parts by weight of tin oxide.

A basis mass which may be used without a supporting body is also a mixture of the following components: 20 parts by weight of calcined steatite, 2 parts by weight of hard glass, such as Jena glass, 3 parts by weight of porcelain clay, 4 parts by weight of feldspar, 5 parts by weight of cristobalite or of fine sand, and 2 parts by weight of tin oxide.

The working of these masses corresponds to that described above. However, the models prepared with the basis masses containing cristobalite show after the sintering process a porous structure in the basic body. The latter is tightened by treatment with an advantageously warm, strong solution of sodium carbonate-sodium silicate by dipping the model into the solution. After the model has been taken out of the solution and dried, the effloresced salts are removed and the model is again burnt at about 950° C. The modelled body may then be glazed in the usual manner. The layer produced by the action of the sodium carbonate-sodium silicate solution has then the effect that the glaze combines with the basic body without cracking. One may also proceed in such a manner that the basis masses, which yield upon heating to the sintering temperature porous bodies, are directly made into a plastic paste with a concentrated sodium silicate solution. The artificial teeth or repair parts prepared from burnt porcelain are then imbedded into the model prepared from the plastic mass and the modelled body is carefully burnt in sand at a temperature of about 1250–1300° C. In this case an after-treatment of the model obtained with sodium carbonate-sodium silicate solution is not necessary. Rather, a tight model is directly obtained which may be glazed in the usual manner. According to another method the glazing frit may be suspended in water-glass solution and the porous basic body which has been burnt at about 1250–1300° C. may be directly covered with such a glaze. After the glaze has entered into the basic body it is at first dried at moderate temperature and then burnt in the usual manner.

It may be mentioned that the new basis masses also satisfy the requirements of the practice with regard to the contraction of the mass.

Porcelain teeth have already been cemented in dental bridges with the aid of ceramic cement. Such a cement however is not suitable as a basis mass in the sense of the invention specified above. Such a cement for instance does not effect a sufficiently strong combination between the porcelain and the usual dental metals. Cements, therefore, cannot be used as binding agent for dental ceramic parts and metallic supporting bodies.

In our new basis masses the content of a substantial quantity of calcined magnesium silicate is of decisive importance for the usefulness of the mass. The basis masses preferably contain at least 25% of the calcined magnesium silicate but the content of the calcined magnesium silicate may amount even to 50 and more percent of the whole basis mass.

We claim:—

1. A basic body for dental repair parts formed from a supporting body and a basis mass combined therewith and comprising at least 25% of calcined magnesium silicate in combination with a dental ceramic ground mass, which contains a substantial quantity of silicates selected from the group consisting of the silicates of sodium, potassium and aluminium.

2. A basic body for dental repair parts formed from a supporting body and a basis mass combined therewith and comprising at least 25% of calcined magnesium silicate in combination with a dental ceramic ground mass, which contains a substantial quantity of silicates selected from the group consisting of the silicates of sodium, potassium and aluminium, and a fluxing material.

3. A basis mass for dental repair parts comprising at least 25% of calcined magnesium silicate in combination with a dental ceramic ground mass which contains a substantial quantity of silicates selected from the group consisting of the silicates of sodium, potassium, and aluminum.

4. A basis mass for dental repair parts as defined in claim 3 comprising also a fluxing material.

FRIEDRICH SCHÖNBECK.
HERMANN SCHRÖDER.